US012580433B2

(12) United States Patent (10) Patent No.: US 12,580,433 B2
Kamogi et al. (45) Date of Patent: Mar. 17, 2026

(54) ROTOR AND MOTOR

(71) Applicant: MINEBEA MITSUMI Inc., Nagano (JP)

(72) Inventors: Yutaka Kamogi, Kitasaku-gun (JP); Junichi Miyaki, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 167 days.

(21) Appl. No.: 18/571,328

(22) PCT Filed: Mar. 30, 2022

(86) PCT No.: PCT/JP2022/016030
§ 371 (c)(1),
(2) Date: Dec. 18, 2023

(87) PCT Pub. No.: WO2023/276386
PCT Pub. Date: Jan. 5, 2023

(65) Prior Publication Data
US 2024/0283308 A1 Aug. 22, 2024

(30) Foreign Application Priority Data
Jun. 29, 2021 (JP) ................................. 2021-107259

(51) Int. Cl.
H02K 1/274 (2022.01)
(52) U.S. Cl.
CPC .................................... H02K 1/274 (2013.01)

(58) Field of Classification Search
CPC ...... H02K 1/27; H02K 1/2706; H02K 1/2713; H02K 1/272; H02K 1/2726; H02K 1/2733;
(Continued)

(56) References Cited

U.S. PATENT DOCUMENTS 11,489,380 B2 11/2022 Ueda et al.
2006/0097601 A1 5/2006 Hauger
(Continued)

FOREIGN PATENT DOCUMENTS

JP H05-207690 A 8/1993
JP 2006-141197 A 6/2006
(Continued)

OTHER PUBLICATIONS

English translation of Written Opinion for corresponding International Application No. PCT/JP2022/016030 mailed Jun. 14, 2022.
(Continued)

*Primary Examiner* — Ahmed Elnakib
(74) *Attorney, Agent, or Firm* — Chrisman Gallo Tochtrop LLC

(57) ABSTRACT

A rotor includes a rotor core, a magnet, and a cover. The rotor core includes an annular portion and a plurality of magnetic pole pieces. The magnet is disposed between two magnetic pole pieces adjacent to each other in a circumferential direction of the plurality of magnetic pole pieces. The cover covers an outer peripheral portion of the magnet, and is formed of a non-magnetic member or a member having magnetism lower than magnetism of the rotor core.

8 Claims, 21 Drawing Sheets

(58) Field of Classification Search
CPC .... H02K 1/274; H02K 1/2746; H02K 1/2753; H02K 1/276; H02K 1/2766; H02K 1/2773; H02K 1/278; H02K 1/2781; H02K 1/2783
See application file for complete search history.

(56) References Cited

U.S. PATENT DOCUMENTS

| | | | | |
|---|---|---|---|---|
| 2014/0191608 | A1* | 7/2014 | Jang | H02K 1/276 |
| | | | | 310/156.22 |
| 2018/0198334 | A1 | 7/2018 | Sano et al. | |
| 2020/0251942 | A1* | 8/2020 | Ueda | H02K 5/16 |
| 2022/0239167 | A1* | 7/2022 | Maeda | H02K 15/021 |

FOREIGN PATENT DOCUMENTS

| | | | |
|---|---|---|---|
| JP | 2012-085445 | A | 4/2012 |
| JP | 2012-200053 | A | 10/2012 |
| JP | 2018-113775 | A | 7/2018 |
| WO | 2018/043288 | A1 | 3/2018 |
| WO | 2019/066004 | A1 | 4/2019 |

OTHER PUBLICATIONS

Extended European Search Report dated May 14, 2025 for corresponding European Application No. 22832547.8.

Notice of Reasons for Refusal dated Aug. 6, 2025 for corresponding Japanese Application No. 2021-107259 and English translation.

International Search Report for corresponding International Application No. PCT/JP2022/016030 mailed Jun. 14, 2022.

Written Opinion for corresponding International Application No. PCT/JP2022/016030 dated Jun. 14, 2022.

* cited by examiner

AXIAL DIRECTION

CIRCUMFERENTIAL DIRECTION

CIRCUMFERENTIAL DIRECTION

CIRCUMFERENTIAL DIRECTION          AXIAL DIRECTION

CIRCUMFERENTIAL
DIRECTION

AXIAL DIRECTION

CIRCUMFERENTIAL DIRECTION     AXIAL DIRECTION

CIRCUMFERENTIAL DIRECTION          AXIAL DIRECTION

CIRCUMFERENTIAL DIRECTION       AXIAL DIRECTION

CIRCUMFERENTIAL DIRECTION     AXIAL DIRECTION

ROTOR AND MOTOR

CROSS-REFERENCE TO RELATED APPLICATIONS

This application is a national stage entry of International Application No. PCT/JP2022/016030 filed on Mar. 30, 2022, which claims the benefit of priority to Japanese Application No. JP2021-107259, filed Jun. 29, 2021, the entire disclosures of which are hereby incorporated herein by reference.

TECHNICAL FIELD

The present invention relates to a rotor and a motor.

BACKGROUND ART

In inner rotor type motors, so-called IPM rotors are known. In IPM rotors, plate-shaped magnets magnetized in front and back directions are disposed in a spoke-like shape in a radial direction so that two adjacent plate-shaped magnets repel each other. In IPM rotors, a locking structure is sometimes used for preventing the plate-shaped magnet from jumping outward in the radial direction due to a repulsive force with an adjacent plate-shaped magnet or a centrifugal force when the rotor rotates.

CITATION LIST

Patent Literature

Patent Document 1: WO 2018/043288
Patent Document 2: JP 2012-200053 A

SUMMARY OF INVENTION

Technical Problem

However, when leakage magnetic flux from the plate-shaped magnet is generated via the locking structure, the magnetic flux interlinking from the plate-shaped magnet to a coil of a stator is reduced, and thus the motor characteristics may be degraded.

In one aspect, an object is to provide a rotor and a motor capable of improving motor characteristics.

Solution to Problem

In one aspect, a rotor includes a rotor core, a magnet, and a cover. The rotor core includes an annular portion and a plurality of magnetic pole pieces. The magnet is disposed between two magnetic pole pieces adjacent to each other in a circumferential direction of the plurality of magnetic pole pieces. The cover covers an outer peripheral portion of the magnet, and is formed of a non-magnetic material or a member having magnetism lower than magnetism of the rotor core.

According to one aspect, the motor characteristics can be improved.

DESCRIPTION OF EMBODIMENTS

Figure 1:
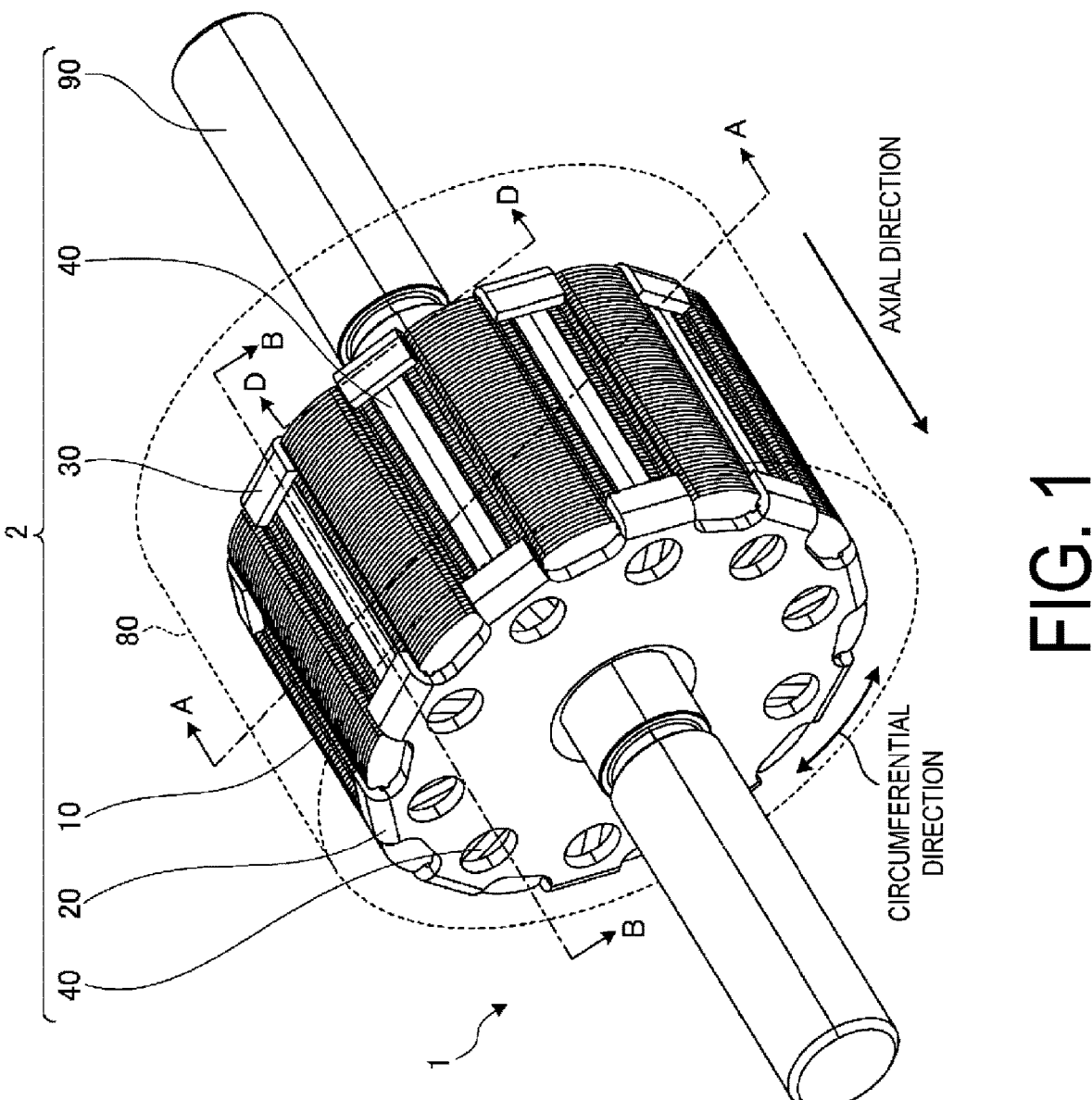
FIG. 1 is a perspective view illustrating an example of a motor according to a first embodiment.

An embodiment of a rotor disclosed in the present application will be elaborated below with reference to the drawings. Note that the dimensional relationships between elements and the ratios of the elements in the drawings may differ from an actual configuration. The drawings may include parts having mutually different dimensional relationships and proportions. In each of the drawings, a coordinate system including at least any one of an axial direction (rotation axis direction of a motor 1), a radial direction, or a circumferential direction of the motor 1 may be illustrated for the purpose of facilitating explanation. The motor 1 will be described later. In addition, the rotation axis direction of the motor 1 may be simply referred to as an "axial direction" below.

First Embodiment

Figure 2:
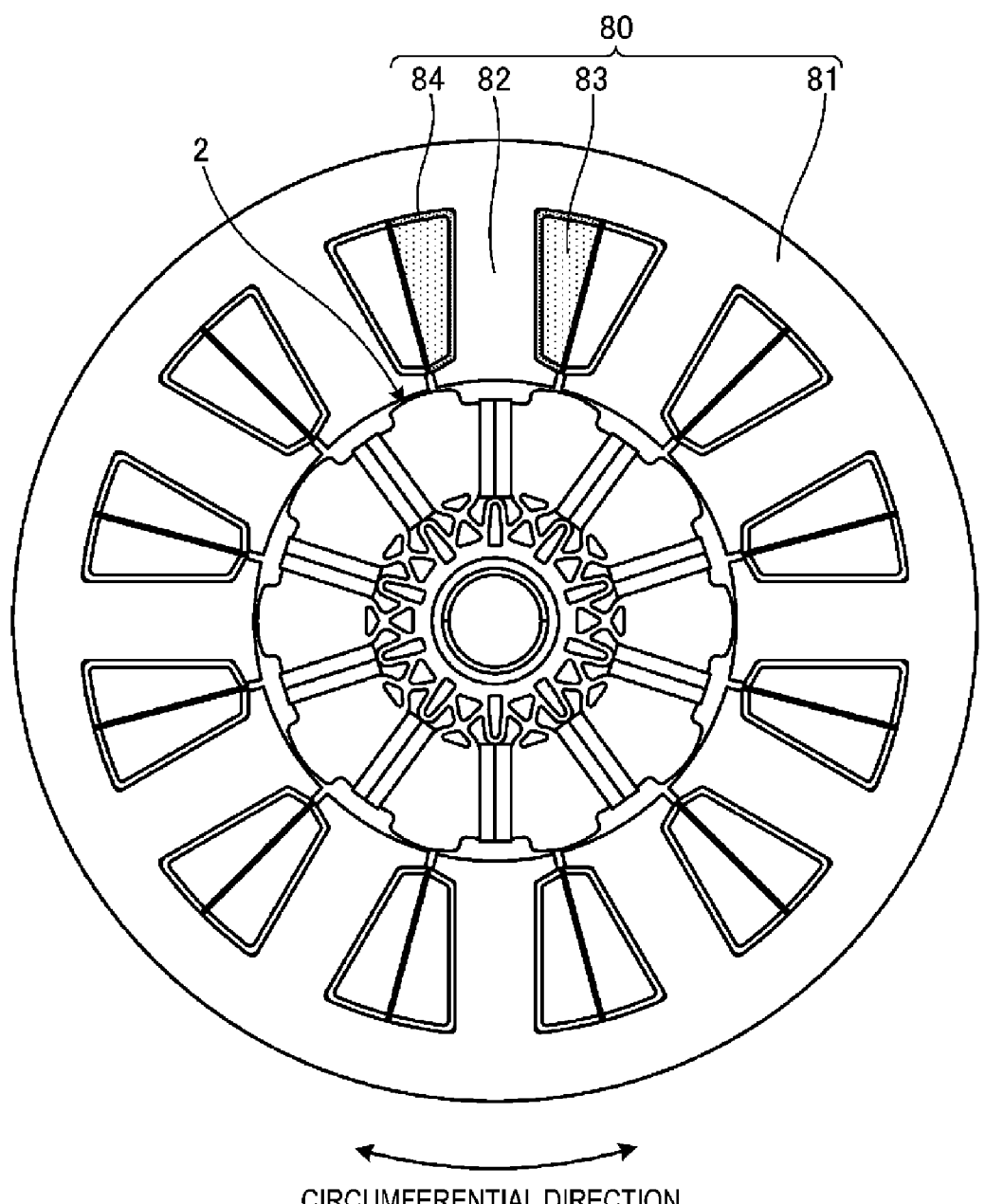
FIG. 2 is a cross-sectional view illustrating an example of the motor according to the first embodiment.

First, a motor 1 of the present embodiment will be described with reference to FIG. 1 and FIG. 2. FIG. 1 is a perspective view illustrating one example of a motor according to a first embodiment. However, a stator is omitted in FIG. 1. FIG. 2 is a cross-sectional view illustrating one example of the motor according to the first embodiment. FIG. 2 illustrates a cross section taken along the line A-A in FIG. 1. As illustrated in FIG. 1, the motor 1 according to the present embodiment includes a rotor 2 and a stator 80. Note that the motor 1 described in each embodiment is an inner rotor type brushless motor. Further, the motor 1 in each embodiment is housed in, for example, a frame (not illustrated).

As illustrated in FIG. 2, the stator 80 includes a yoke 81, teeth 82, coils 83, and insulators 84. The yoke 81 is an annular member formed at the outer peripheral side of the stator 80. The teeth 82 protrude inward in the radial direction from the yoke 81. The yoke 81 and the teeth 82 are formed by, for example, punching a flat plate-shaped member formed of a magnetic material such as a magnetic steel plate into a shape illustrated in FIG. 2 and stacking a plurality of the punched members in the axial direction. The coils 83 are wound around the teeth 82 via the insulators 84, for example.

As illustrated in FIGS. 1 and 2, the rotor 2 is rotatably inserted into the stator 80 in the radial direction. The rotor 2 includes a rotor core 10, covers 20 and 30, a plurality of plate-shaped magnets 40, and a shaft 90. For example, the shaft 90 is inserted into the rotor 2 in the radial direction.

Figure 3:
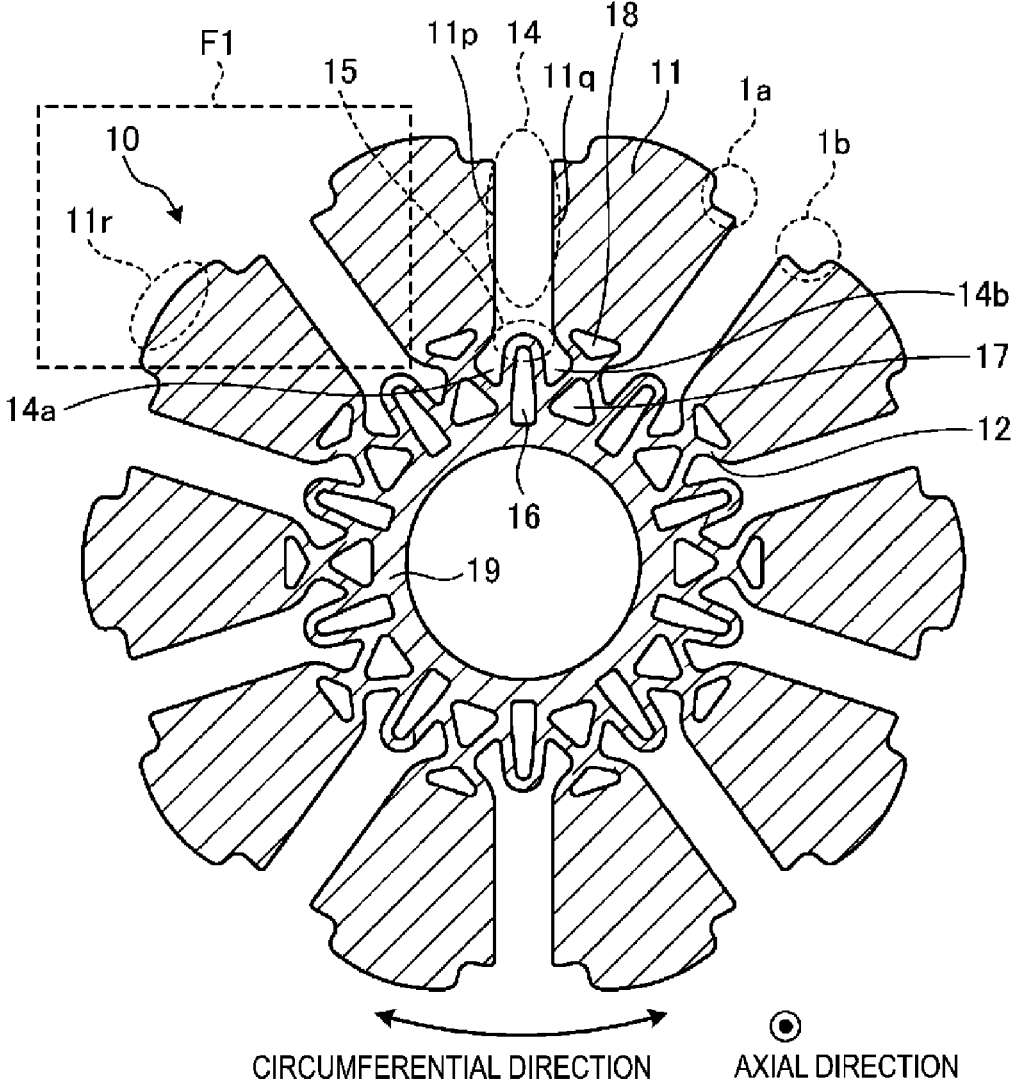
FIG. 3 is a cross-sectional view illustrating an example of a rotor core according to the first embodiment.
Figure 4:
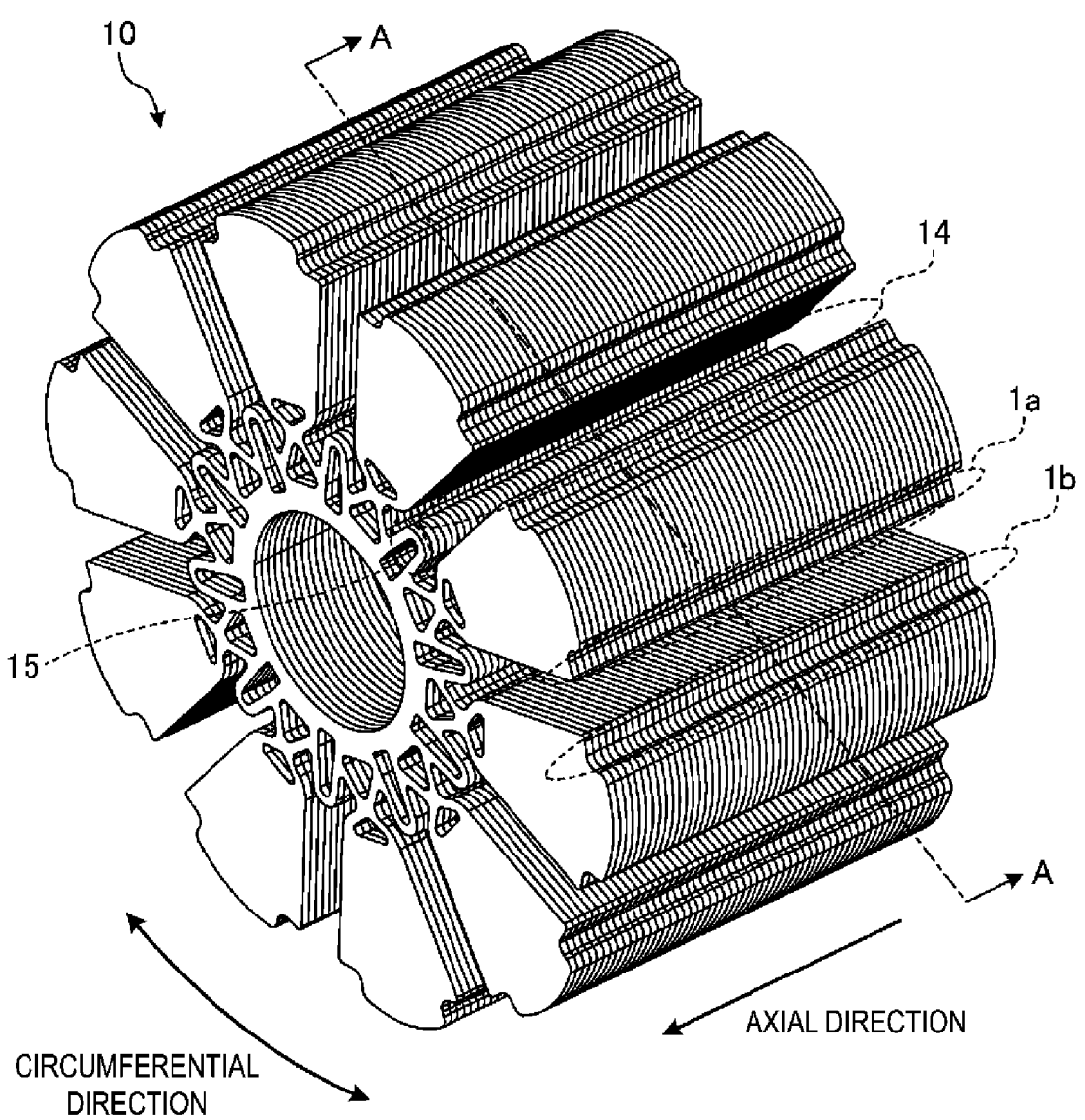
FIG. 4 is a perspective view illustrating an example of the rotor core according to the first embodiment.

The rotor core 10 has a stacked structure obtained by stacking a plurality of steel plate cores formed of a soft magnetic material such as a silicon steel plate. FIG. 3 is a cross-sectional view illustrating an example of a rotor core according to the first embodiment. FIG. 4 is a perspective view illustrating an example of the rotor core according to the first embodiment. FIG. 3 illustrates a cross section taken along the line A-A in FIG. 4. As illustrated in FIGS. 3 and 4, the rotor core 10 includes a plurality of magnetic pole pieces 11, coupling portions 12, support portions 15, and an annular portion 19. Note that the rotor core 10 may further include lightening portions 16, 17, and 18 in order to reduce leakage magnetic flux. Note that when the magnetic pole pieces 11 are distinguished from each other, they may be referred to as magnetic pole pieces 11A to 11J below.

The plurality of magnetic pole pieces 11 extend outward in the radial direction from the annular portion 19. The plurality of magnetic pole pieces 11 are arranged side by side in the circumferential direction. Each of the magnetic pole pieces 11 includes end portions 11p and 11q extending substantially in the radial direction and an outer peripheral portion 11r extending in the circumferential direction. The end portion 11p opposes, across a gap 14 in the circumferential direction, the end portion 11q of the circumferentially adjacent magnetic pole piece 11. The outer peripheral portion 11r constitutes the outer periphery of the rotor 2.

Figure 5:
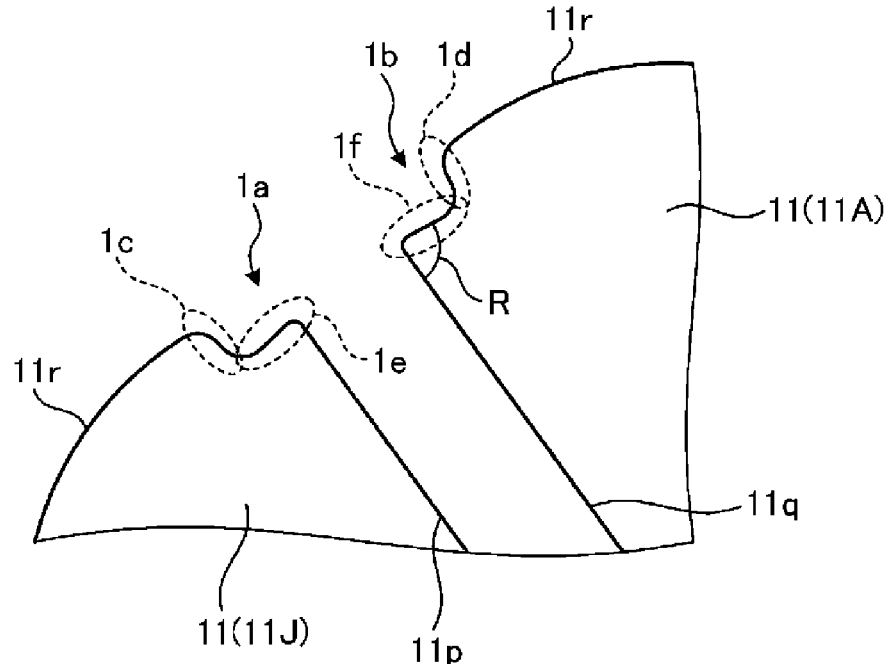
FIG. 5 is an enlarged cross-sectional view illustrating an example of a recessed portion of the rotor core according to the first embodiment.

As illustrated in FIGS. 3 and 5, a recessed portion 1a cut out in the circumferential direction and the radial direction is formed at one side in the circumferential direction of each outer peripheral portion 11r. Further, a recessed portion 1b cut out in the circumferential direction and the radial direction is formed at the other side in the circumferential direction of each outer peripheral portion 11r. FIG. 5 is an enlarged cross-sectional view illustrating an example of a recessed portion of the rotor core according to the first embodiment. FIG. 5 is an enlarged view of a portion illustrated in a frame F1 in FIG. 3. As illustrated in FIG. 5, the recessed portion 1a includes a first portion 1c connected to the outer peripheral portion 11r, and a second portion 1e constituting an inner diameter-side end portion of the recessed portion 1a and connected to the end portion 11p. Similarly, the recessed portion 1b includes a first portion 1d connected to the outer peripheral portion 11r, and a second portion 1f constituting an inner diameter-side end portion of the recessed portion 1b and connected to the end portion 11q. Note that the outer peripheral portion 11r, the first portion 1c of the recessed portion 1a, and the second portion 1e of the recessed portion 1a are continuously formed. Similarly, the outer peripheral portion 11r, the first portion 1d of the recessed portion 1b, and the second portion 1f of the recessed portion 1b are continuously formed. In other words, the outer peripheral portion 11r, the second portion 1e of the recessed portion 1a, and the second portion 1f of the recessed portion 1b constitute an outer peripheral end portion of the rotor core 10.

As illustrated in FIG. 5, the recessed portion 1b formed at the magnetic pole piece 11A opposes, in the circumferential direction, the recessed portion 1a formed at the magnetic pole piece 11J circumferentially adjacent to the magnetic pole piece 11A. More specifically, the first portion 1d of the recessed portion 1b of the magnetic pole piece 11A and the first portion 1c of the recessed portion 1a of the magnetic pole piece 11J oppose each other in the circumferential direction. Further, as illustrated in FIG. 5, the recessed portion 1b is formed such that an angle R formed by the second portion 1f and the end portion 11q is an acute angle. The same applies to the recessed portion 1a.

The shaft 90 is inserted into the annular portion 19 in the radial direction via the inner peripheral portions 29 and 39 of the covers 20 and 30. The plurality of magnetic pole pieces 11 and the annular portion 19 are coupled to each other in the radial direction by the coupling portions 12. In the present embodiment, the inner diameter of the annular portion 19 is formed to be larger than the outer diameters of the inner peripheral portions 29 and 39 of the covers 20 and 30.

The support portion 15 extends outward in the radial direction from the annular portion 19. In other words, the support portion 15 protrudes outward in the radial direction from the annular portion 19. As illustrated in FIG. 3, the support portion 15 opposes the gap 14 in the radial direction. In the present embodiment, for example, the width of the gap 14 is formed to be substantially the same as or slightly larger than the width (the length in the circumferential direction) of the plate-shaped magnet 40. Further, air layers 14a and 14b are formed at both sides in the circumferential direction at the inner side in the radial direction of the gap 14, respectively. Note that at this time, the air layer 14a and the air layer 14b are disposed adjacent to each other in the circumferential direction of the support portion 15.

Figure 6:
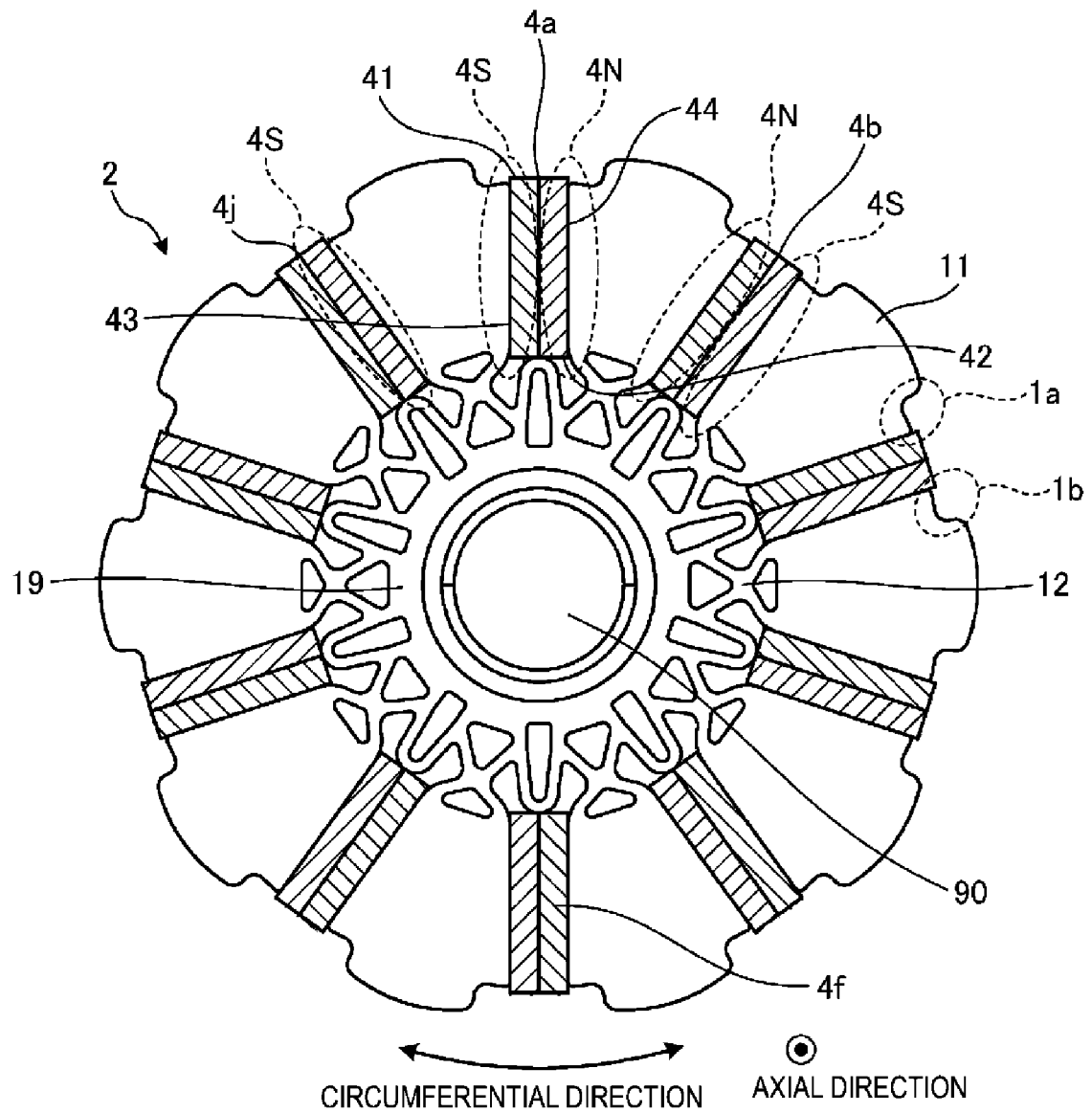
FIG. 6 is a cross-sectional view illustrating an example of the rotor according to the first embodiment.

As illustrated in FIG. 6, the plate-shaped magnet 40 is inserted into the gap 14 of the rotor core 10. FIG. 6 is a cross-sectional view illustrating an example of the rotor according to the first embodiment. FIG. 6 illustrates a cross section of the rotor 2 taken along the line A-A in FIG. 4. The rotor 2 in the present embodiment includes ten plate-shaped magnets 40. Note that when the plate-shaped magnets 40 are distinguished from each other, they may be referred to as plate-shaped magnets 4a to 4j below.

As illustrated in FIG. 6, the plate-shaped magnet 40 includes a radially outer end surface 41, a radially inner end surface 42, a circumferentially counterclockwise-side end surface 43, and a circumferentially clockwise-side end surface 44. As illustrated in FIG. 6, the plate-shaped magnet 40 includes an N-pole 4N and an S-pole 4S. In the present embodiment, two plate-shaped magnets 40 adjacent to each other in the circumferential direction are disposed such that the same poles oppose each other. For example, as illustrated in FIG. 6, two plate-shaped magnets 4a and 4b adjacent to each other in the circumferential direction are disposed such that the N-poles 4N oppose each other. The two plate-shaped magnets 4*j* and 4*a* adjacent to each other in the circumferential direction are disposed such that the S-poles 4S oppose each other.

The radially inner end surface 42 of the plate-shaped magnet 40 is supported in the radial direction by the support portion 15 of the rotor core 10. Specifically, the end surface 42 is supported by the support portion 15 in the vicinity of the center of the plate-shaped magnet 40 in the circumferential direction. In the present example, the support portion 15 supports a switching point, and the N-pole 4N and the S-pole 4S of the plate-shaped magnets 40 are switched at the switching point. In this case, since the air layer 14*a* and 14*b* are provided at both end portions of the end surface 42 in the circumferential direction without a conventional locking structure, the magnetic flux generated from both end portions of the end surface 42 in the circumferential direction are guided to the rotor core 10. In this case, the magnetic flux not interlinking with the stator winding and directly flowing into the opposite magnetic pole at the other surface of the plate-shaped magnet decreases. According to such a configuration, it is possible to suppress leakage of the magnetic flux from both end portions in the circumferential direction at the radially inner side of the plate-shaped magnet 40.

Figure 7:
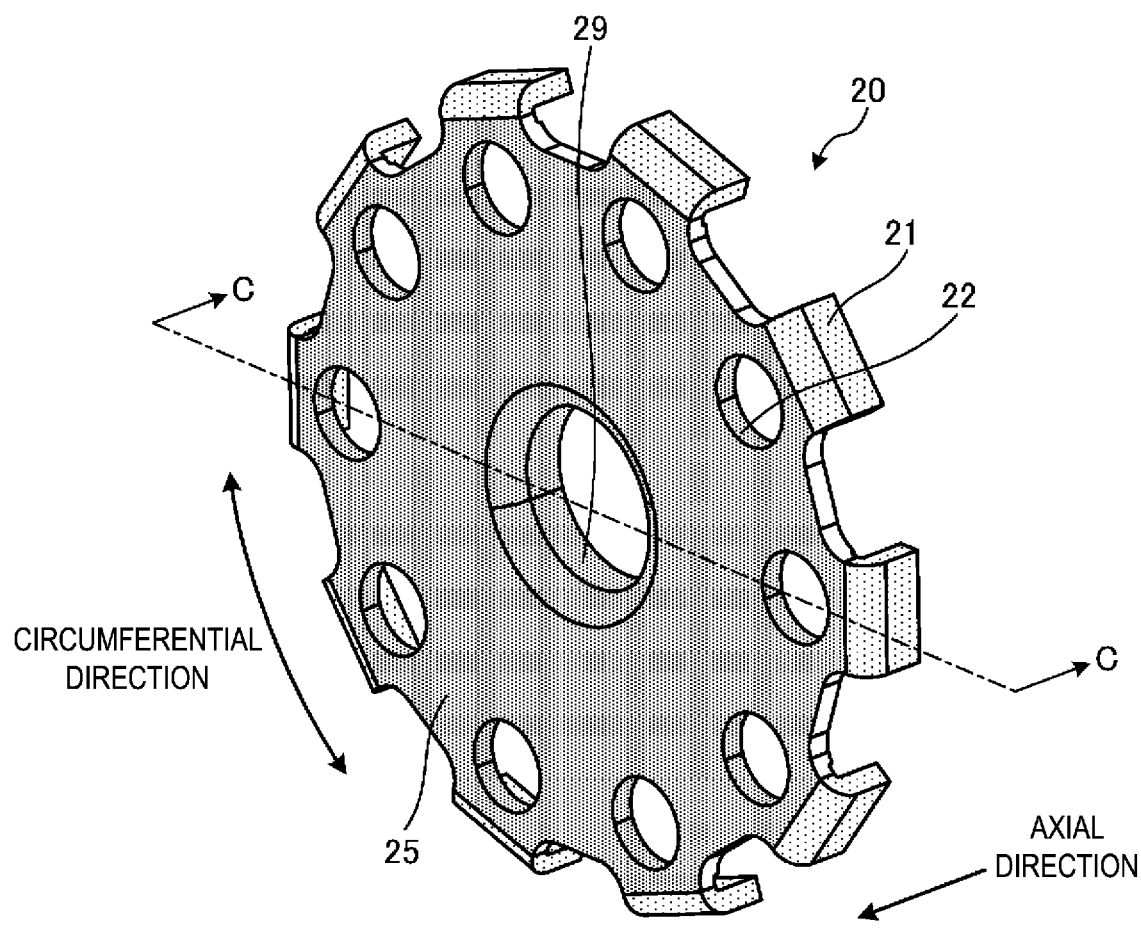
FIG. 7 is a perspective view illustrating an example of a cover according to the first embodiment.
Figure 8:
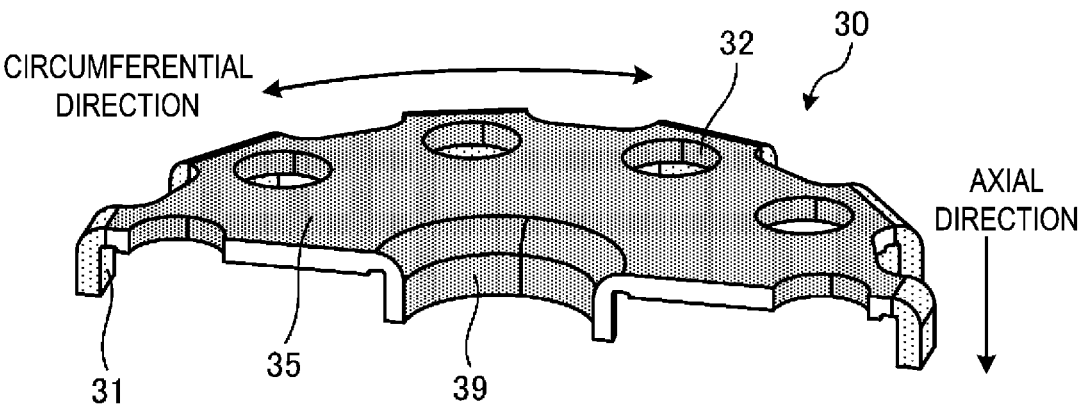
FIG. 8 is a cross-sectional perspective view illustrating an example of the cover according to the first embodiment.

In the rotor 2 illustrated in FIG. 6, the plate-shaped magnet 40 disposed at the rotor core 10 may jump outward in the radial direction or in the positive direction or the negative direction in the axial direction due to a repulsive force with the other plate-shaped magnets 40 adjacent in the circumferential direction or a centrifugal force generated by the rotation of the rotor 2. Therefore, in the present embodiment, the covers 20 and 30 as illustrated in FIGS. 7 and 8 are attached to the rotor core 10 as illustrated in FIG. 1, thereby preventing the plate-shaped magnet 40 from jumping out. FIG. 7 is a perspective view illustrating an example of a cover according to the first embodiment. FIG. 8 is a cross-sectional perspective view illustrating an example of the cover according to the first embodiment. FIG. 8 illustrates a cross section taken along the line C-C in FIG. 7. As illustrated in FIG. 1, the cover 20 is attached to the rotor core 10 from the positive direction side in the axial direction, and the cover 30 is attached to the rotor core 10 from the negative direction side in the axial direction.

As illustrated in FIG. 7, the cover 20 includes a plurality of protruding portions 21, a planar portion 25, and an inner peripheral portion 29. Further, the cover 20 may further include a plurality of opening portions 22. Note that although the cover 20 is illustrated in FIG. 7 and the cover 30 is illustrated in FIG. 8, the covers 20 and 30 in the present embodiment have the same shape, and matters described below with respect to the cover 20 also apply to the cover 30 unless otherwise specified. For example, the cover 30 also includes a plurality of protruding portions 31, a planar portion 35, an inner peripheral portion 39, and a plurality of opening portions 32. Similarly, matters described with respect to the cover 30 also apply to the cover 20 unless otherwise specified.

In the present embodiment, the cover 20 is formed of a non-magnetic material such as brass. Further, the cover 20 may be formed by bending a material having magnetism lower than magnetism of the magnetic steel plate constituting the rotor core 10, such as austenitic stainless steel.

Figure 9:
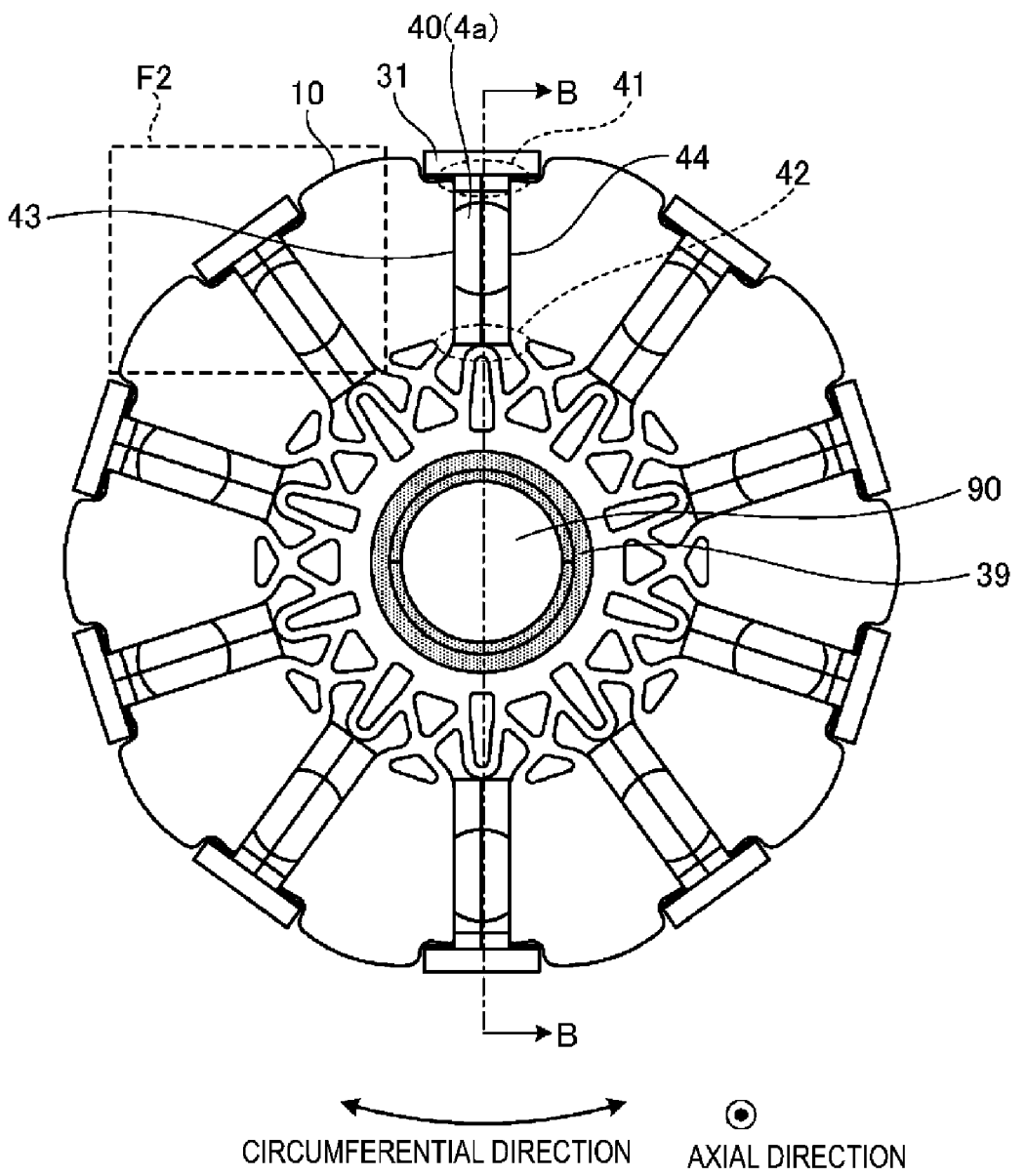
FIG. 9 is a cross-sectional view illustrating an example of the rotor core according to the first embodiment.
Figure 10:
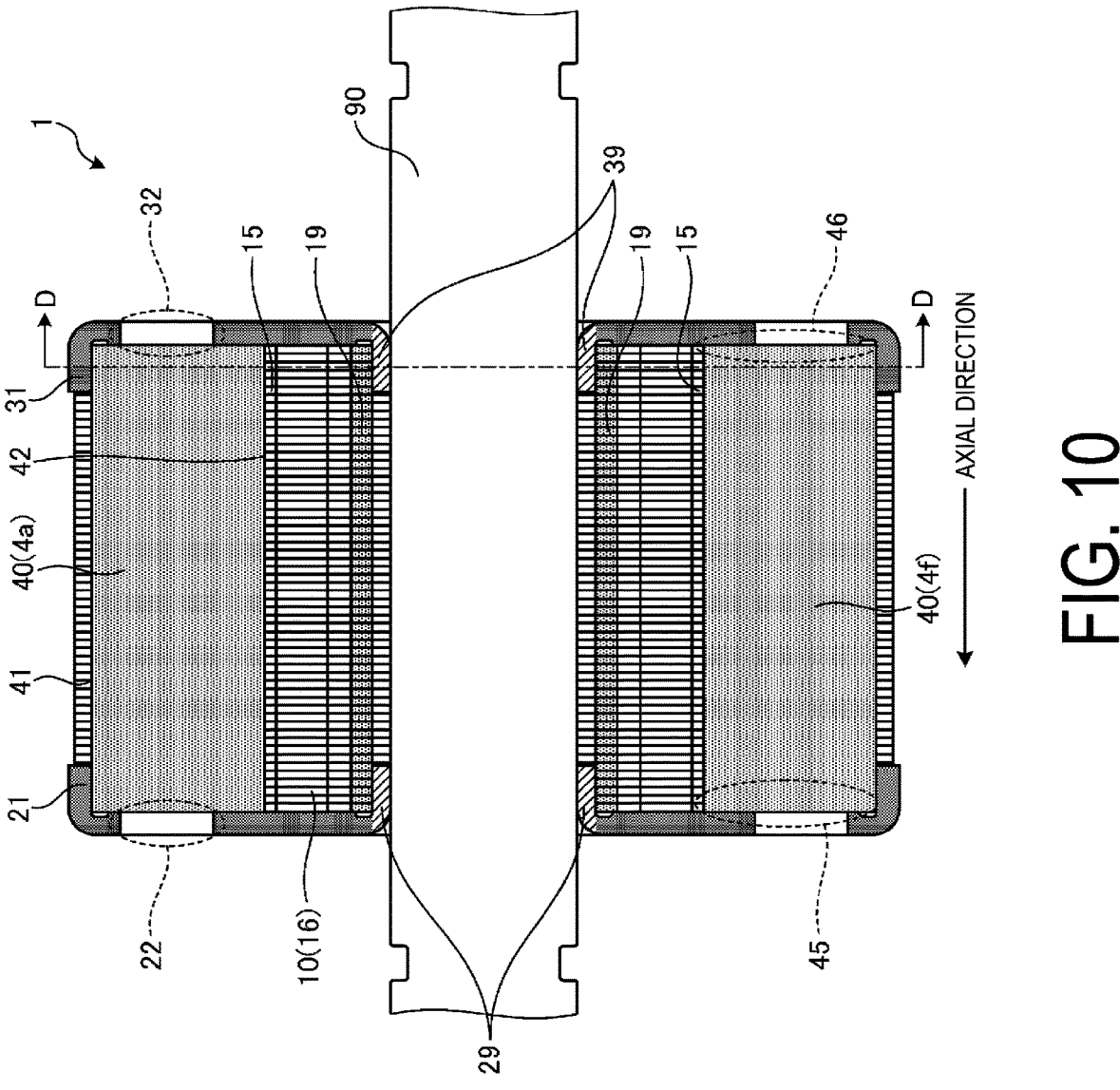
FIG. 10 is a side cross-sectional view illustrating an example of the rotor core according to the first embodiment.

As illustrated in FIG. 7, each of the protruding portions 21 protrudes from the planar portion 25 in the axial direction. For example, the plurality of protruding portions 21 are arranged at equal intervals in the circumferential direction. More specifically, as illustrated in FIGS. 9 and 10, the same number of protruding portions 21 as the number of plate-shaped magnets 40 are formed at positions in contact with parts of the plate-shaped magnets 40, for example, parts of the end surfaces 41 at the axially positive direction side. FIG. 9 is a cross-sectional view illustrating an example of the rotor core according to the first embodiment. In FIG. 9, the plate-shaped magnets are omitted. FIG. 10 is a side cross-sectional view illustrating an example of the rotor core according to the first embodiment. FIG. 10 illustrates a cross section taken along the line B-B in FIGS. 1 and 9. FIG. 9 illustrates a cross section taken along the line D-D in FIG. 1 or FIG. 10. As illustrated in FIG. 10, in addition to the end surfaces 41 to 44 illustrated in FIGS. 6 and 9, the plate-shaped magnet 40 further includes an end surface 45 at the axially positive direction side and an end surface 46 at the axially negative direction side.

As illustrated in FIGS. 9 and 10, each protruding portion 21 of the cover 20 protrudes toward the axially negative direction side, and each protruding portion 31 of the cover 30 protrudes toward the axially positive direction side. In this case, of the radially outer end surface 41 of the plate-shaped magnet 40, a part at the axially positive direction side is in contact with the protruding portion 21 of the cover 20, and a part at the axially negative direction side is in contact with the protruding portion 31 of the cover 30.

The opening portions 22 are formed extending through the planar portion 25 in the axial direction. As illustrated in FIG. 10, the opening portions 22 oppose the end surfaces 45 of the plate-shaped magnets 40 at the axially positive direction side. In this case, as illustrated in FIG. 1, the plate-shaped magnets 40 are visually recognized from the axially positive direction side through the opening portions 22.

The inner peripheral portion 29 protrudes from the planar portion 25 in the axial direction similarly to the protruding portion 21. The outer diameter of the inner peripheral portion 29 is, for example, substantially the same as or slightly larger than the inner diameter of the annular portion 19 of the rotor core 10. The inner diameter of the inner peripheral portion 29 is, for example, substantially the same as or slightly smaller than the outer diameter of the shaft 90. In such a configuration, for example, the covers 20 and 30 are inserted by being press-fitted between the annular portion 19 of the rotor core 10 and the shaft 90 in the radial direction. At this time, by coupling the shaft 90 and the rotor core 10 via the inner peripheral portion 29, a force applied when the shaft 90 and the rotor core 10 are assembled does not increase even in a case where, for example, the axial length of the rotor core 10 is long. Thus, the coupling force between the shaft 90 and the rotor core 10 can be made constant regardless of the axial length of the rotor core 10. Note that at this time, it is possible to adjust the coupling force between the rotor core 10 and the cover 20 and adjust the coupling force between the shaft 90 and the rotor core 10 by changing the shape of the inner diameter of the annular portion 19 of the rotor core 10 or the outer diameter of the inner peripheral portion 29 of the cover 20, for example, by forming the inner diameter or the outer diameter into a polygonal shape.

Figure 11:
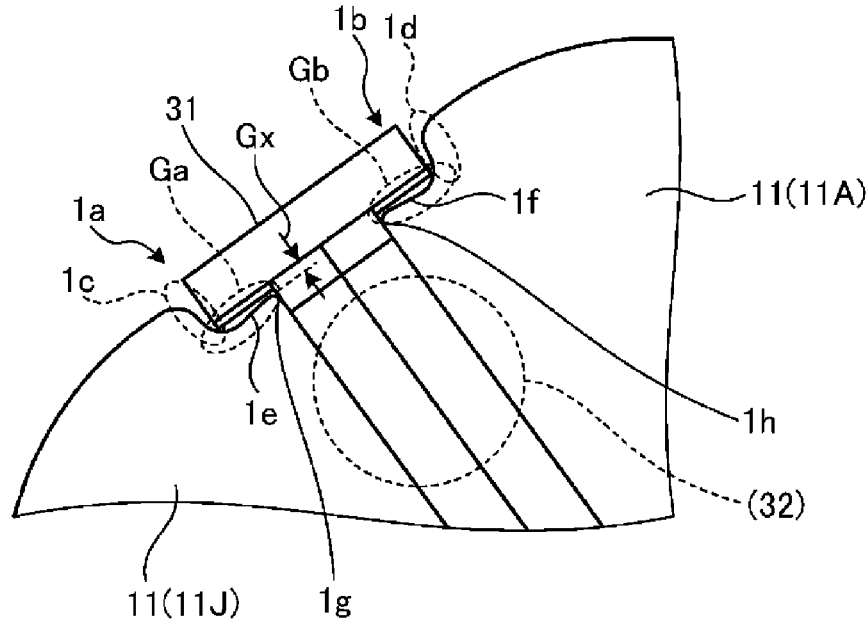
FIG. 11 is an enlarged cross-sectional view illustrating an example of the rotor according to the first embodiment.

FIG. 11 is an enlarged cross-sectional view illustrating an example of the rotor according to the first embodiment. FIG. 11 is an enlarged view of a portion indicated by a frame F2 in FIG. 9. As illustrated in FIG. 11, the radially outer end surface 41 of the plate-shaped magnet 40 is in contact with the protruding portion 31 of the cover 30, and protrudes outward in the radial direction beyond the recessed portions 1*a* and 1*b*, more specifically, beyond the second portion 1*e* of the recessed portion 1*a* and the second portion 1*f* of the recessed portion 1b. In such a configuration, a gap Ga in the radial direction is formed between the protruding portion 31 and the second portion 1e of the recessed portion 1a of the rotor core 10. Similarly, a gap Gb in the radial direction is formed between the protruding portion 31 and the second portion 1f of the recessed portion 1b. Further, a gap Gx in the radial direction is formed between corner portions 1g and 1h and the cover 20. In the present embodiment, the corner portions 1g and 1h have an acute angle (angle R illustrated in FIG. 5).

In such a configuration, since a locking structure by the rotor core 10 is not disposed in the radial direction at the radially outer end surface 41 of the plate-shaped magnet 40 as illustrated in FIG. 6, the magnetic flux generated from the circumferential end portion is guided to the rotor core 10. Since the covers 20, 30 are formed of a non-magnetic material or a material having magnetism lower than magnetism of the magnetic steel plate constituting the rotor core 10, the leakage of the magnetic flux directly flowing into the opposite magnetic pole at the other surface of the plate-shaped magnet is suppressed. In addition, by providing the recessed portions 1a and 1b, the covers 20, 30 can be easily disposed, and the length of the magnetic path of the leakage magnetic flux is increased and the magnetic resistance is increased, so that the leakage magnetic flux can be suppressed. Further, by forming the corner portions 1g and 1h to have an acute angle, the magnetic path of the leakage magnetic flux connected from the recessed portions 1a and 1b to the other recessed portion also goes out to the air layer substantially perpendicularly from the recessed portions 1a and 1b. Thus, the distance to the other recessed portion can be further increased, and the magnetic resistance is increased, so that the leakage of the magnetic flux is further suppressed.

Further, in IPM rotors, since it is difficult to make the magnetic flux density distribution in the rotor surface space to be a sine wave having an ideal waveform with respect to cogging and torque ripple, the curvature of the tip of the magnetic pole piece is adjusted to improve cogging and torque ripple as illustrated in Patent Document 1. However, when it is necessary to provide a locking structure at the radially outer side of the plate-shaped magnet, the selectable shape of the tip of the magnetic pole piece is limited. However, in each of the magnetic pole pieces 11 according to the present embodiment, it is not necessary to install a locking structure by the rotor core, and the plate-shaped magnet 40 protrudes outward in the radial direction from the recessed portions 1a and 1b of the rotor core 10 but is positioned inward in the radial direction of the outer peripheral portion 11r. According to such a configuration, cogging and torque ripple can be easily adjusted by changing the width or curvature of the outer peripheral portion 11r.

As described above, the rotor 2 in the present embodiment includes the rotor core 10, the magnets 40, and the covers 20, 30. The rotor core 10 includes the annular portion 19 and the plurality of magnetic pole pieces 11. The magnet 40 is disposed between two magnetic pole pieces adjacent to each other in a circumferential direction of the plurality of magnetic pole pieces 11. The cover 20, 30 covers the outer peripheral portion of the magnets 40, and is formed of a non-magnetic member or a member having magnetism lower than magnetism of the rotor core 10. According to such a configuration, the leakage of the magnetic flux via the rotor core 10 can be suppressed, so that the motor characteristics can be improved.

In addition, in the present embodiment, the two adjacent magnetic pole pieces 11 include the recessed portions 1a and 1b recessed in the radial direction, and the recessed portions 1a and 1b included in the two adjacent magnetic pole pieces 11 are each disposed opposing the magnet 40 in the circumferential direction. Further, in the radial direction, the gaps Ga and Gb are formed between inner diameter-side end portions 1e and 1f of the recessed portions 1a and 1b and the covers 20 and 30. According to such a configuration, it is possible to suppress the magnetic flux leaking outward in the radial direction.

Further, in the present embodiment, the covers 20 and 30 are formed of a non-magnetic member or a member having magnetism lower than magnetism of a member forming the magnetic pole piece 11 of the rotor core 10. In the plate-shaped magnet 40 of the present embodiment, at least parts of the radially outer end surface 41 are in contact with the non-magnetic or low-magnetic covers 20 and 30. Since a locking structure by the rotor core 10 is not disposed in the radial direction at the radially outer end surface 41 of the plate-shaped magnet 40, the magnetic flux not interlinking with the stator winding and directly flowing into the opposite magnetic pole at the other surface of the plate-shaped magnet is suppressed. According to such a configuration, the leakage magnetic flux is reduced.

Further, the cover 20 in the present embodiment may include the opening portions 22 opening in the axial direction. In this case, the opening portions 22 oppose the magnets 40 in the axial direction. In this case, the plate-shaped magnets 40 and the rotor core 10 can be easily fixed to each other by injecting an adhesive or the like from the opening portions 22.

Second Embodiment

Figure 12:
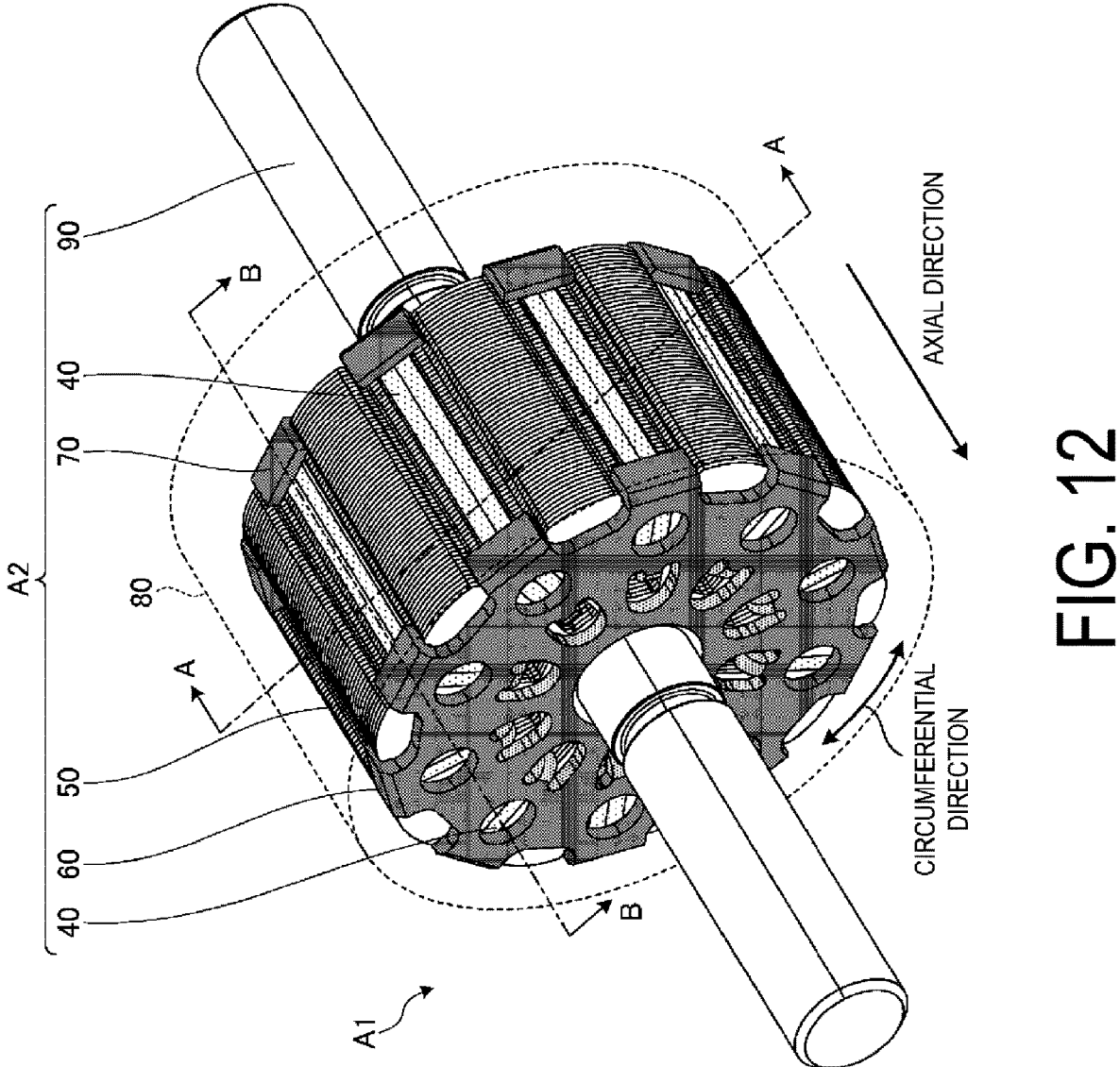
FIG. 12 is a perspective view illustrating an example of a rotor according to a second embodiment.

Since the covers 20 and 30 in the first embodiment can be easily formed by bending a sheet metal or the like, it is easy to form a cover having a shape different from the shape illustrated in the first embodiment. For example, the cover may be formed to be in contact with not only a part of the end surface 41 of the plate-shaped magnet 40 but also a part of the end surface 42. FIG. 12 is a perspective view illustrating an example of a rotor according to a second embodiment. As illustrated in FIG. 12, a motor A1 according to the second embodiment includes a rotor A2 and a stator 80. However, the stator is omitted in FIG. 12. Note that in the following embodiment and modifications, the same portions as those illustrated in the drawings described above are denoted by the same reference signs, and the redundant description will be omitted.

Figure 13:
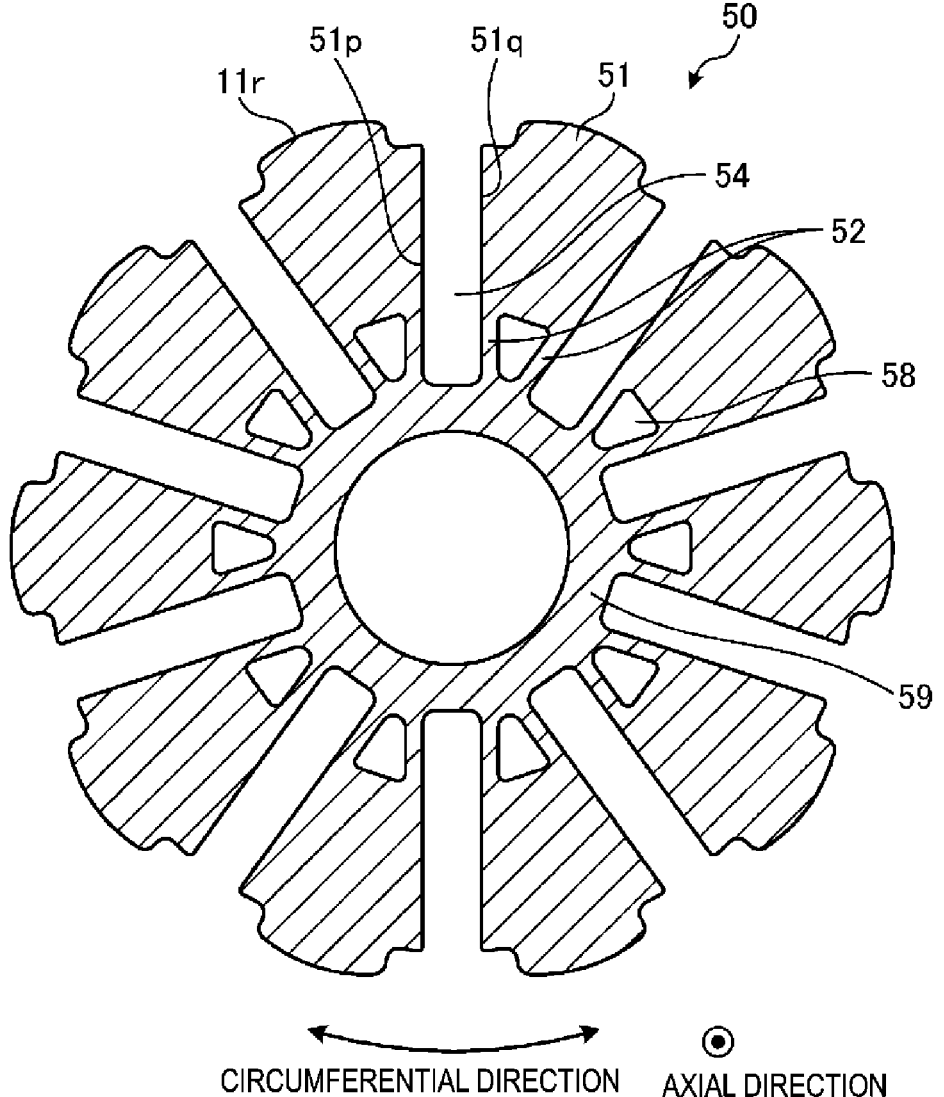
FIG. 13 is a cross-sectional view illustrating an example of a rotor core according to the second embodiment.

The rotor A2 illustrated in FIG. 12 includes a rotor core 50, covers 60 and 70, plate-shaped magnets 40, and a shaft 90. As illustrated in FIG. 13, the rotor core 50 includes a plurality of magnetic pole pieces 51, coupling portions 52, and an annular portion 59. FIG. 13 is a cross-sectional view illustrating an example of a rotor core according to the second embodiment. As illustrated in FIG. 13, the magnetic pole piece 51 in the second embodiment includes the outer peripheral portion 11r extending in the circumferential direction, and end portions 51p and 51q extending in the radial direction. In the second embodiment as well, the plurality of magnetic pole pieces 51 and the annular portion 59 are coupled to each other in the radial direction by the coupling portions 52. Note that the magnetic pole piece 51 may further include a lightening portion 58.

Figure 14:
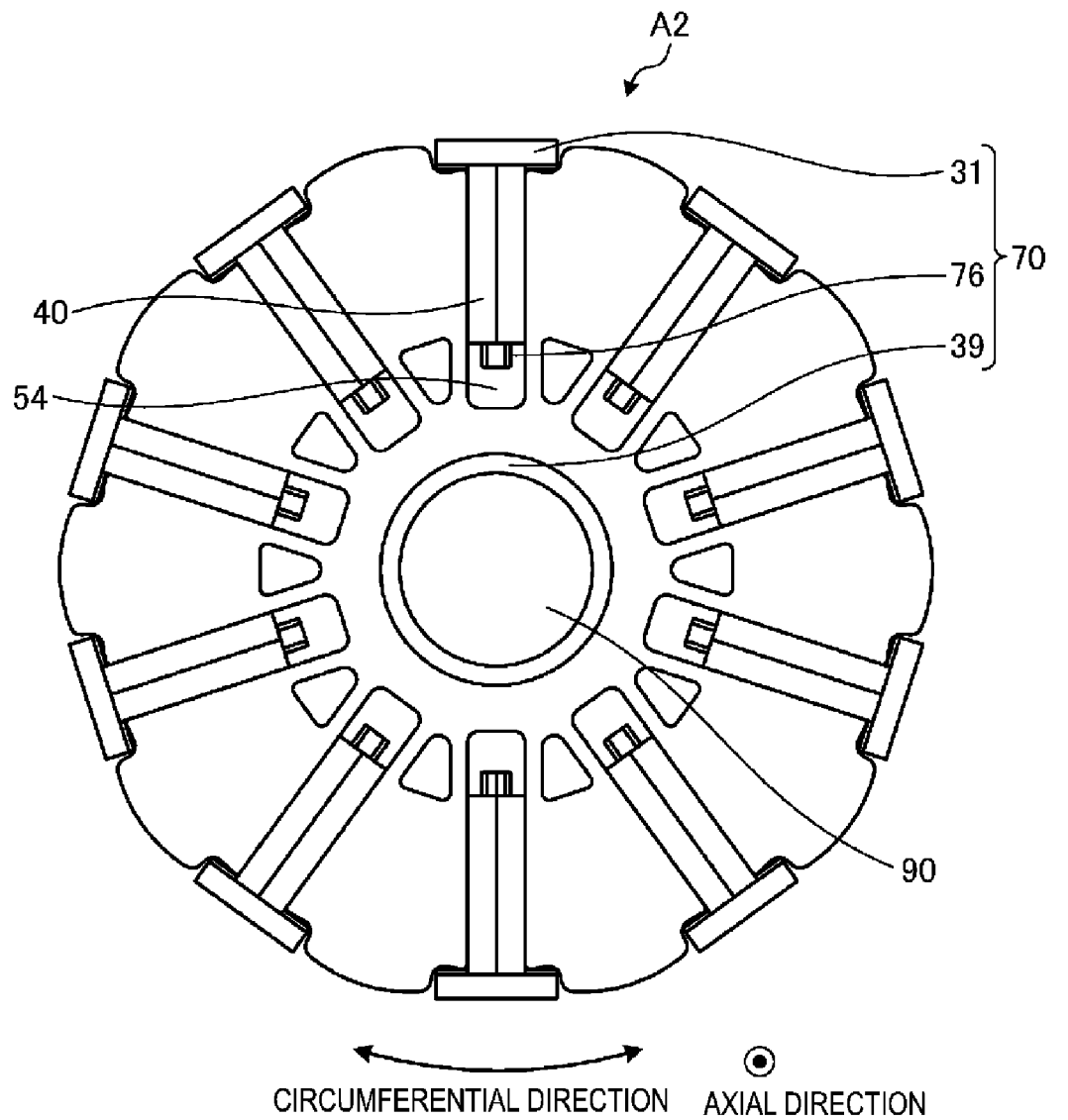
FIG. 14 is a cross-sectional view illustrating an example of the rotor according to the second embodiment.

In the second embodiment as well, as illustrated in FIG. 14, the plate-shaped magnet 40 is housed in a gap 54 interposed between two adjacent magnetic pole pieces 51 in the rotor core 50. FIG. 14 is a cross-sectional view illustrating an example of the rotor according to the second embodiment.

The end portions 51*p* and 51*q* in the second embodiment extend inward in the radial direction beyond the radially inner end surface 42 of the plate-shaped magnet 40. In such a configuration, as illustrated in FIG. 14, the radially inner end surface 42 of the plate-shaped magnet 40 in the second embodiment is supported not by the support portion 15 but by the cover 70.

Figure 15:
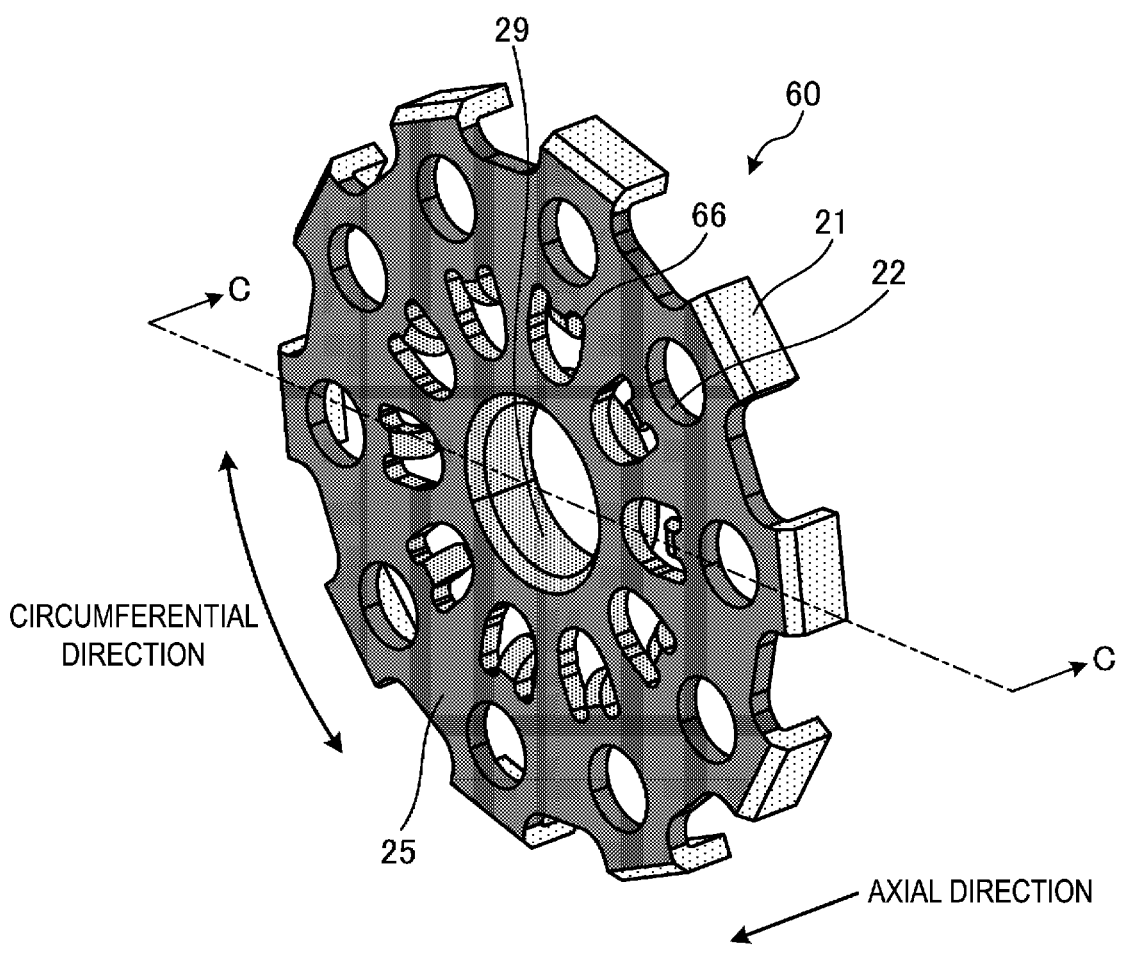
FIG. 15 is a perspective view illustrating an example of a cover according to the second embodiment.
Figure 16:
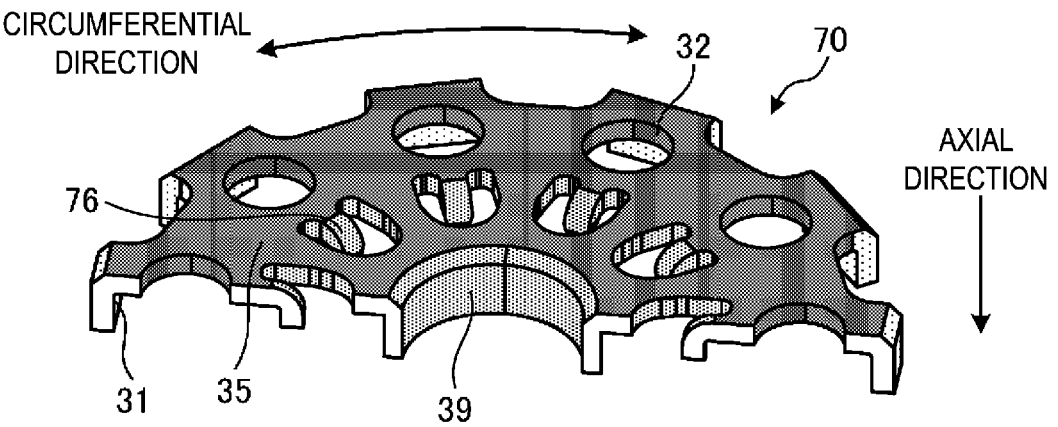
FIG. 16 is a cross-sectional perspective view illustrating an example of the cover according to the second embodiment.

FIG. 15 is a perspective view illustrating one example of a cover according to the second embodiment. FIG. 16 is a cross-sectional perspective view illustrating an example of the cover according to the second embodiment. FIG. 16 illustrates a cross section taken along the line C-C in FIG. 15. Note that in the second embodiment as well, the covers 60 and 70 have the same shape, and matters described below with respect to the cover 60 also apply to the cover 70 unless otherwise specified. Similarly, matters described with respect to the cover 70 also apply to the cover 60 unless otherwise specified.

In the second embodiment as well, the cover 60 is formed of a non-magnetic material such as brass or a material having magnetism lower than magnetism of the magnetic steel plate constituting the rotor core 50. As illustrated in FIG. 15, the cover 60 further includes contact portions 66 in addition to the protruding portions 21, the opening portions 22, the planar portion 25, and the inner peripheral portion 29.

The contact portions 66 of the cover 60 protrude from the planar portion 25 in the axial direction, similarly to the protruding portions 21 and the inner peripheral portion 29. Similarly to the protruding portions 21, for example, the contact portions 66 are arranged at equal intervals in the circumferential direction to oppose the plate-shaped magnets 40 in the radial direction, and the number of the contact portions 66 is the same as the number of the plate-shaped magnets 40. Similarly to the opening portions 22, portions extending through the planar portion 25 in the axial direction are formed around the contact portions 66. In the second embodiment, the contact portions 66 of the cover 60 protrude toward the axially negative direction side, and the contact portions 76 of the cover 70 protrude toward the axially positive direction side.

Figure 17:
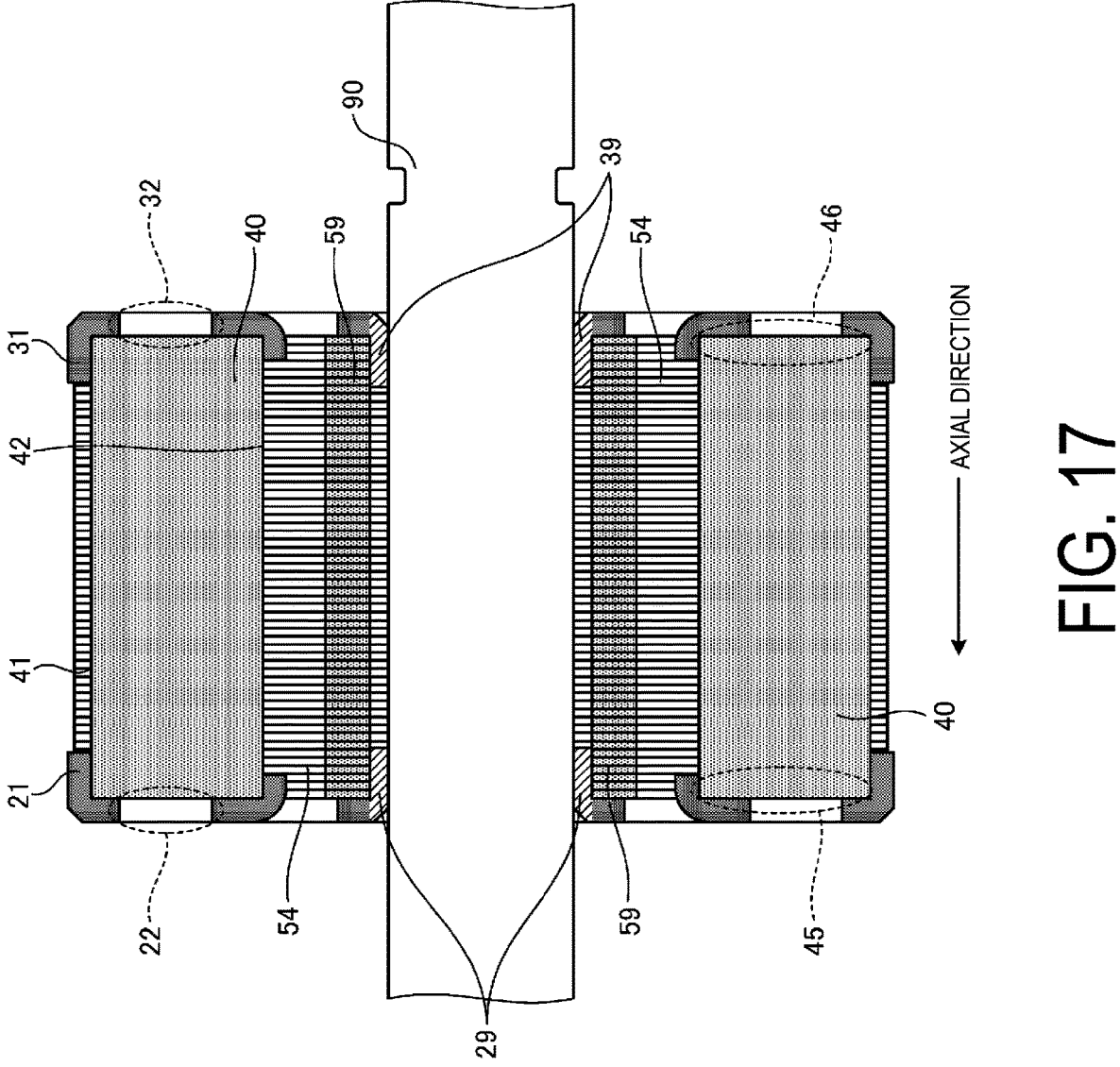
FIG. 17 is a side cross-sectional view illustrating an example of the rotor according to the second embodiment.

As illustrated in FIGS. 14 and 17, the contact portions 66 and 76 are in contact with the radially inner end surface 42 of the plate-shaped magnet 40. FIG. 17 is a side cross-sectional view illustrating an example of the rotor according to the second embodiment. As illustrated in FIGS. 14 and 17, the contact portion 66 is inserted into the gap 54 of the rotor core 50 from the axially positive direction side. The contact portion 66 supports the radially inner end surface 42 of the plate-shaped magnet 40 from the radially inner side. In such a configuration, the plate-shaped magnet 40 is supported in the radial direction by the protruding portion 21 and the contact portion 66 of the cover 60, and by the protruding portion 31 and the contact portion 76 of the cover 70.

As described above, in the rotor A2 according to the second embodiment, the cover 60 includes the contact portions 66, and the contact portions 66 are in contact with the magnets 40 at the radially inner end surfaces 42 of the magnets 40. According to such a configuration, leakage of the magnetic flux not interlinking with the stator winding and directly flowing into the opposite magnetic pole at the other surface of the plate-shaped magnet from one of the radially inner end surfaces of the plate-shaped magnet 40 is suppressed.

Figure 18:
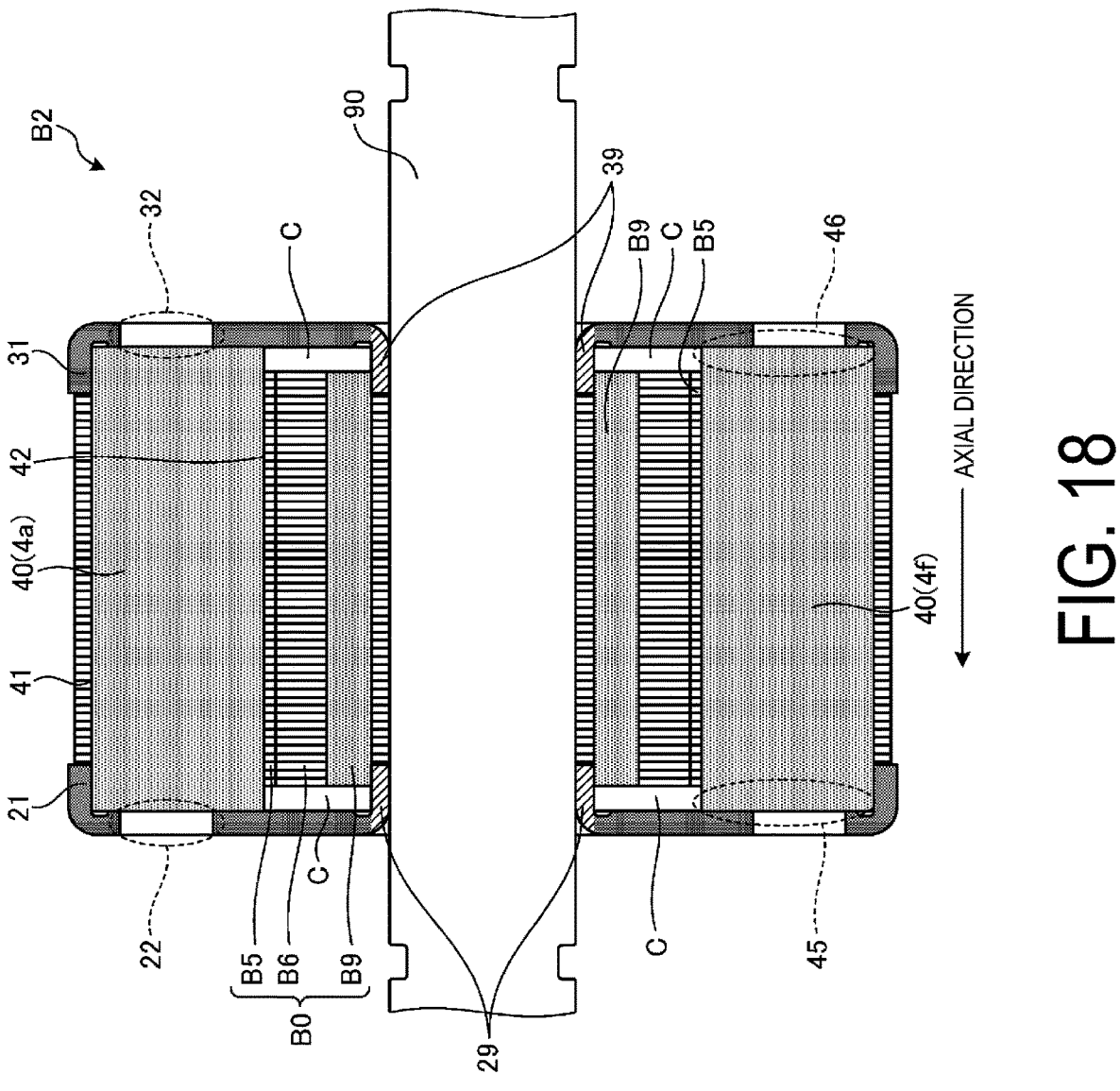
FIG. 18 is a side cross-sectional view illustrating an example of a rotor according to a first modification.

The configuration of each of the embodiments has been described above, but the embodiments are not limited. For example, the end surfaces 45 and 46 of the plate-shaped magnet 40 in the axial direction may not be flush with the end surfaces of the rotor core 10 in the axial direction. As illustrated in FIG. 18, the end surface 45 in the axial direction of the plate-shaped magnet 40 may protrude toward the axially positive direction side beyond an end surface in the axial direction of a rotor core B0. FIG. 18 is a side cross-sectional view illustrating an example of a rotor according to a first modification. In the configuration illustrated in FIG. 18, the axial length of the rotor core B0 is smaller than the length of the plate-shaped magnet 40. Specifically, a space C is formed between the rotor core B0 and the covers 20 and 30 in the axial direction. Thus, the end surfaces 45 and 46 of the plate-shaped magnet 40 in the axial direction do not oppose a support portion B5 of the rotor core B0 in the radial direction. In addition, the inner peripheral portion 29 of the cover 20 and the inner peripheral portion 39 of the cover 30 are disposed between the end surfaces 45 and 46, and the shaft 90 opposing the plate-shaped magnets 40 in the radial direction.

According to such a configuration, the magnetic flux of the plate-shaped magnet 40 can be converged into a range opposing the stator, and the magnetic flux interlinking with the stator winding can be increased, whereby the characteristics of the motor can be improved.

Figure 19:
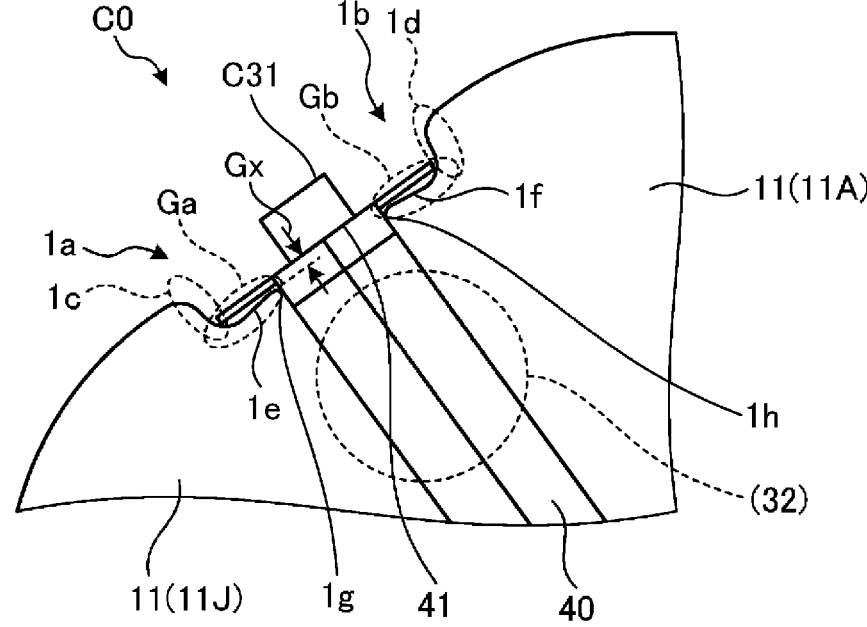
FIG. 19 is an enlarged cross-sectional view illustrating an example of a rotor according to a second modification.

In the protruding portion 21 in the first embodiment, for example, as illustrated in FIG. 6, the end portion in the axial direction of the radially outer end surface 41 of the plate-shaped magnet 40 is, in the entire circumferential direction, in contact with the protruding portion 21, and the recessed portions 1*a* and 1*b* are in contact with the vertex of the protruding portion 21. However, the embodiment is not limited to this. For example, as illustrated in FIG. 19, a rotor core C0 may be configured such that only a part of the plate-shaped magnet 40 in the circumferential direction, more specifically, only the vicinity of the central portion in the circumferential direction is in contact with a protruding portion C31. FIG. 19 is an enlarged cross-sectional view illustrating an example of a rotor according to a second modification. In such a configuration, the protruding portion C31 of a cover C30 is in contact with neither of the recessed portions 1*a* and 1*b*. As long as the jumping-out of the plate-shaped magnet 40 can be suppressed, the protruding portion C31 may cover only the central portion of the plate-shaped magnet 40 as illustrated in FIG. 19.

In addition, the outer peripheral portion 11*r*, the first portion 1*c*, the second portion 1*e*, and the end portion 11*p* illustrated in FIG. 5 are continuously connected by, for example, a curved line but, as this is not a limitation, may be discontinuously formed in straight lines. The same applies to the outer peripheral portion 11*r*, the first portion 1*d*, the second portion 1*f*, and the end portion 11*q*. Further, the end portions 11*p* and 11*q* of the rotor core 10 may be formed in a curved shape. In this case, for example, the first portions 1*c* and 1*d* may be in contact with the entire end surfaces of the protruding portion 21 of the cover 20 in the circumferential direction.

Figure 20:
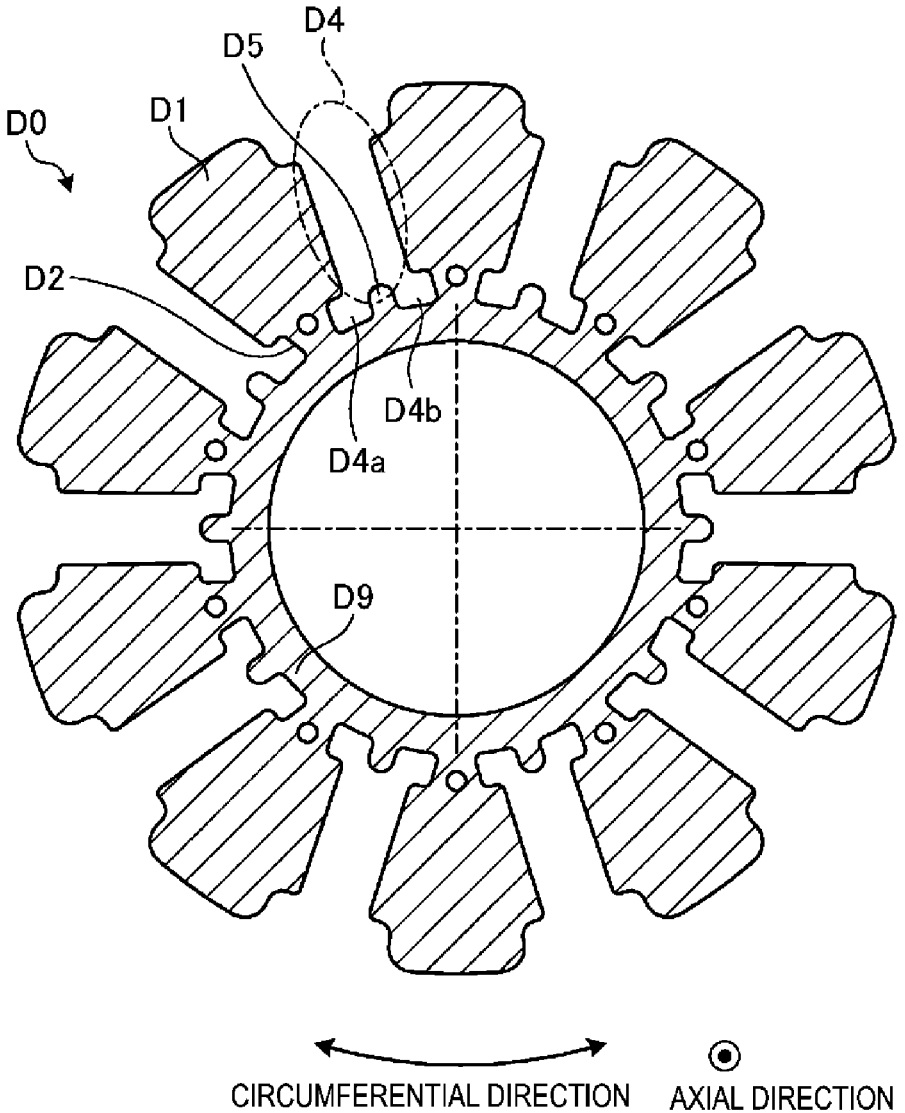
FIG. 20 is a cross-sectional view illustrating an example of a rotor core according to a third modification.

Further, in the rotor core 50 of the second embodiment, air layers extending in the circumferential direction and corresponding to the reference signs 14*a* and 14*b* of FIG. 3 are not formed at the radially inner side of the gap 54, but this is not a limitation, and as illustrated in FIG. 20, an annular portion D9 and support portions D5 protruding outward in the radial direction from the annular portion D9 may be provided, and air layers D4*a* and D4*b* extending in the circumferential direction of a gap D4 may be provided. In other words, the support portion D5 and the air layers D4a and D4b are disposed adjacent to each other in the circumferential direction. FIG. 20 is a cross-sectional view illustrating an example of a rotor core according to a third modification. In a rotor core DO of the third modification as well, a plurality of magnetic pole pieces D1 and an annular portion D9 are coupled in the radial direction by coupling portions D2. According to such a configuration, it is possible to suppress leakage of the magnetic flux from both end portions in the circumferential direction at the radially inner side of the plate-shaped magnet 40.

Figure 21:
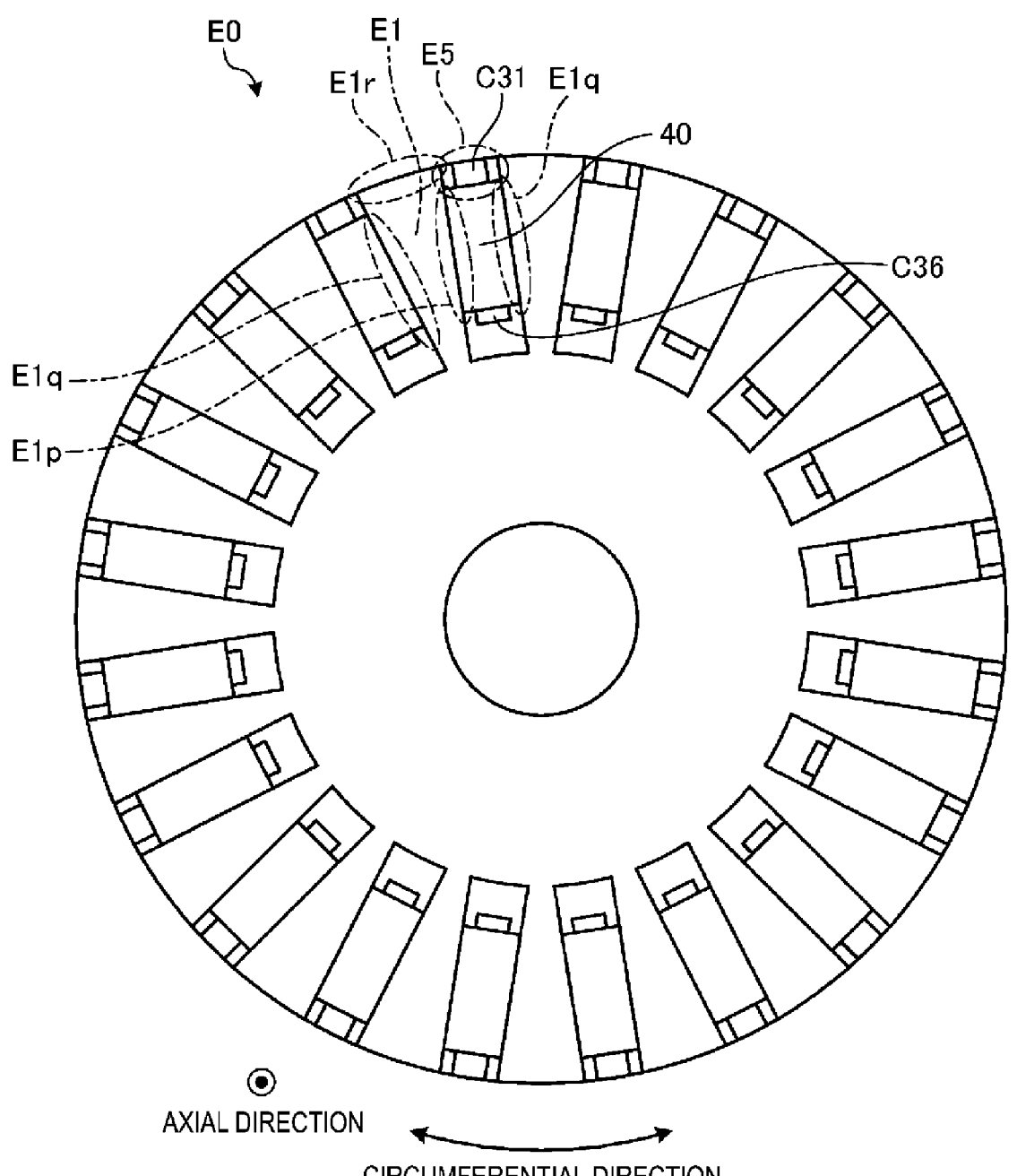
FIG. 21 is a cross-sectional view illustrating an example of a rotor according to a fourth modification.

Further, in the rotor core 50 of the second embodiment, the recessed portion recessed in the radial direction corresponding to the reference signs 1a and 1b of FIG. 3 is formed at the outer peripheral end portion, but this is not a limitation, and as illustrated in FIG. 21, an outer peripheral portion E1r and end portions E1p and E1q of a magnetic pole piece E1 of a rotor core E0 may be continuously formed without an intervening recessed portion. FIG. 21 is a cross-sectional view illustrating an example of a rotor according to a fourth modification. In the rotor core E0 illustrated in FIG. 21, the outer peripheral portion E1r and the end portions E1p and E1q are continuously disposed. According to such a configuration, even a multi-pole or small-diameter rotor core E0 can be easily manufactured.

Note that the protruding portion C31 of the cover C30 in the fourth modification is in contact with only the vicinity of the central portion of the plate-shaped magnet 40 in the circumferential direction as in the second modification. In this case, the radially inner end surface 42 of the plate-shaped magnet 40 is supported by a contact portion C36 of the cover C30 but, as this is not a limitation, may be supported by the support portion D5 of the rotor core DO as illustrated in FIG. 20. Further, in the fourth modification, a configuration corresponding to the coupling portions 52 in FIG. 13 is not provided, but the lightening portions 58 and the coupling portions 52 may be provided similarly to FIG. 13.

The present invention has been described above based on the embodiments and the modifications, but the present invention is not limited to the embodiments and the modifications, and it goes without saying that various changes are possible without departing from the gist of the present invention. Various modifications within a scope not departing from the gist are included in the technical scope of the present invention, and this is obvious to a person having skill in the art from the description of the claims.

REFERENCE SIGNS LIST

1, A1 Motor; 2. A2 Rotor; 10, 50, B0, C0, D0, E0 Rotor core; 11, 51, D1, E1 Magnetic pole piece; 12, 52, D2 Coupling portion; 14, 54, D4 Gap; 15, B5, D5 Support portion; 19, 59, D9 Annular portion; 20, 30, 60, 70 Cover; 21, 31, C31 Protruding portion; 22, 32, Opening portion; 25, 35 Planar portion; 66, 76, C36 Contact portion; 29, 39 Inner peripheral portion; 40 Plate-shaped magnet; 41 to 46 End surface; 80 Stator; 90 Shaft; 1a, 1b Recessed portion; 11r, E1r Outer peripheral portion; 11p, 11q, 51p, 51q, E1p, E1q End portion; 1c, 1d First portion; 1e, 1f Second portion; 1g, 1h Corner portion.

The invention claimed is:

1. A rotor comprising:
a shaft including a first end portion and a second end portion; and
a rotor core including:
an annular portion; and
a plurality of magnetic pole pieces;
a magnet disposed between two magnetic pole pieces adjacent to each other in a circumferential direction of the plurality of magnetic pole pieces;
a cover including:
a planar portion;
a protruding portion protruding from the planar portion in an axial direction; and
an inner peripheral portion protruding directly from a first end portion side of the planar portion in the axial direction,
wherein the protruding portion of the cover covers an outer peripheral portion of the magnet in a radial direction,
wherein the inner peripheral portion of the cover is disposed between the annular portion and the shaft in a radial direction; and
the cover is formed of a non-magnetic material or a material having magnetism lower than magnetism of a material forming the magnetic pole pieces.

2. The rotor according to claim 1, wherein
the two adjacent magnetic pole pieces include recessed portions recessed in the radial direction.

3. The rotor according to claim 2, wherein
each of the recessed portions of the two adjacent magnetic pole pieces is opposed to the magnet in the circumferential direction.

4. The rotor according to claim 1, wherein
The cover includes an opening portion opening in an axial direction, and
the opening portion opposes the magnet in the axial direction.

5. The rotor according to claim 1, wherein
the rotor core includes a support portion protruding in the radial direction, and
the support portion and the magnet are in contact with each other.

6. The rotor according to claim 1, wherein
the cover includes a contact portion, and
the contact portion is in contact with the magnet at a radially inner side of the magnet.

7. A motor comprising the rotor according to claim 1.

8. The rotor according to claim 1, wherein a curved edge is formed between the inner peripheral portion and the first end portion side of the planar portion.

* * * * *